US010006494B2

(12) United States Patent
Otozai

(10) Patent No.: US 10,006,494 B2
(45) Date of Patent: Jun. 26, 2018

(54) TORQUE TRANSMISSION MECHANISM

(71) Applicant: Shimadzu Corporation, Kyoto-shi (JP)

(72) Inventor: Keitaro Otozai, Ibaraki (JP)

(73) Assignee: Shimadzu Corporation, Nakagyo-ku, Kyoto-shi, Kyoto (JP)

( * ) Notice: Subject to any disclaimer, the term of this patent is extended or adjusted under 35 U.S.C. 154(b) by 0 days. days.

(21) Appl. No.: 15/307,696

(22) PCT Filed: Apr. 28, 2014

(86) PCT No.: PCT/JP2014/061825
§ 371 (c)(1),
(2) Date: Oct. 28, 2016

(87) PCT Pub. No.: WO2015/166525
PCT Pub. Date: Nov. 5, 2015

(65) Prior Publication Data
US 2017/0045092 A1 Feb. 16, 2017

(51) Int. Cl.
*F16H 35/10* (2006.01)
*F16D 7/06* (2006.01)
(Continued)

(52) U.S. Cl.
CPC ............. *F16D 7/06* (2013.01); *F16D 43/20* (2013.01); *F16D 43/204* (2013.01); *F16H 1/28* (2013.01); *F16H 35/10* (2013.01)

(58) Field of Classification Search
None
See application file for complete search history.

(56) References Cited

U.S. PATENT DOCUMENTS 1,245,574 A * 11/1917 Dean ...................... B23Q 15/00
192/129 A
1,815,345 A * 7/1931 Colman .............. F16D 43/2028
192/150
(Continued)

FOREIGN PATENT DOCUMENTS

DE 2318760 A1 10/1973
GB 1392025 4/1975
(Continued)

OTHER PUBLICATIONS

Written Opinion by the International Search Authority dated Jul. 22, 2014 in PCT/JP2014/061825.
(Continued)

*Primary Examiner* — Dirk Wright
(74) *Attorney, Agent, or Firm* — Muir Patent Law, PLLC

(57) ABSTRACT

This torque transmission mechanism (1) includes a transmission mechanism portion (2) that includes an input shaft (21), an output shaft (22), and an intermediate portion (23) including a connection portion (23*b*). The torque transmission mechanism includes a limiting mechanism portion (3) that is capable of switching between a connection state where the limiting mechanism portion is connected to the connection portion and limits rotation of the intermediate portion and a disconnection state where the limiting mechanism portion is disconnected from the connection portion and allows the rotation of the intermediate portion, and switches to the disconnection state when torque of at least a predetermined value acts in the connection state.

15 Claims, 5 Drawing Sheets

(51) Int. Cl.
*F16D 43/20* (2006.01)
*F16D 43/204* (2006.01)
*F16H 1/28* (2006.01)

(56) References Cited

U.S. PATENT DOCUMENTS

| | | | | |
|---|---|---|---|---|
| 3,079,814 | A | * | 3/1963 | Nickstadt ............ F16H 61/0293 |
| | | | | 475/265 |
| 3,102,438 | A | * | 9/1963 | Leather .................. F16H 3/663 |
| | | | | 475/263 |
| 3,115,791 | A | * | 12/1963 | Dean ........................ F16H 3/54 |
| | | | | 192/150 |
| 4,075,910 | A | * | 2/1978 | Davis ..................... F01D 21/00 |
| | | | | 188/166 |
| 4,318,334 | A | * | 3/1982 | Nelson ................... F01C 20/06 |
| | | | | 173/8 |
| 6,231,012 | B1 | | 5/2001 | Cacciola et al. |
| 7,465,248 | B2 | * | 12/2008 | Katoh ..................... F16H 35/10 |
| | | | | 475/264 |

FOREIGN PATENT DOCUMENTS

| | | |
|---|---|---|
| JP | 57-196829 U | 12/1982 |
| JP | 62-199541 U | 12/1987 |
| JP | 06-001882 U | 1/1994 |
| JP | 2009-063163 A | 3/2009 |

OTHER PUBLICATIONS

Extended European Search Report dated Apr. 13, 2017 in corresponding European patent application No. 14890795.9.
International Search Report dated Jul. 22, 2015, PCT/JP2014/061825.

* cited by examiner (FIRST MODIFICATION)

TORQUE TRANSMISSION MECHANISM

TECHNICAL FIELD

The present invention relates to a torque transmission mechanism, and more particularly, it relates to a torque transmission mechanism having a torque limiting function that prevents transmission of input torque of at least a predetermined value to an output shaft side.

BACKGROUND ART

In general, a torque transmission mechanism having a torque limiting function is known. Such a torque transmission mechanism is disclosed in U.S. Pat. No. 6,231,012, for example.

A torque transmission mechanism disclosed in the aforementioned U.S. Pat. No. 6,231,012 includes an input shaft, an output shaft, and an intermediate gear portion that connects the input shaft to the output shaft. The intermediate gear portion is provided with an input-side gear and an output shaft gear on both ends of a shaft member provided with a notch in its outer periphery, respectively. When the input torque of at least the predetermined value is applied to the shaft member of the intermediate gear portion, a notched portion is broken (fractured). Thus, in the intermediate gear portion, rotation of the input-side gear is no longer transmitted to the output-side gear. Consequently, transmission of the input torque of at least the predetermined value to an output shaft side is prevented.

PRIOR ART

Patent Document

Patent Document 1: U.S. Pat. No. 6,231,012

SUMMARY OF THE INVENTION

Problems to be Solved by the Invention

In the torque transmission mechanism according to the aforementioned U.S. Pat. No. 6,231,012, torque transmission is limited by breakage of the shaft member, and hence it is necessary to replace the shaft member after activation of the torque limiting function (after breakage of the shaft member). Thus, unless component replacement is performed, there is such a problem that resetting is impossible after activation of the torque limiting function. Particularly when the torque transmission mechanism is used in a rudder face controller (rudder face driving device) of an aircraft, it is necessary to recover the torque limiting function promptly within a limited amount of time, which is maintenance time for the aircraft (one night or several hours to the next flight, for example). Thus, in the torque transmission mechanism in which component replacement operation is required to recover the torque limiting function, it is difficult to recover the torque limiting function promptly.

The present invention has been proposed in order to solve the aforementioned problem, and an object of the present invention is to provide a torque transmission mechanism in which resetting is possible after activation of a torque limiting function.

Means for Solving the Problem

In order to attain the aforementioned object, a torque transmission mechanism according to an aspect of the present invention includes a transmission mechanism portion that includes an input shaft, an output shaft, and an intermediate portion including a connection portion and transmits input torque input into the input shaft to the output shaft through the intermediate portion, and a limiting mechanism portion that is capable of switching between a connection state where the limiting mechanism portion is connected to the connection portion and limits rotation of the intermediate portion and a disconnection state where the limiting mechanism portion is disconnected from the connection portion and allows the rotation of the intermediate portion, and switches to the disconnection state when torque of at least a predetermined value acts in the connection state.

As hereinabove described, the torque transmission mechanism according to this aspect of the present invention is provided with the connection portion in the intermediate portion of the transmission mechanism portion and the limiting mechanism portion that is capable of switching between the connection state where the limiting mechanism portion is connected to the connection portion and limits the rotation of the intermediate portion and the disconnection state where the limiting mechanism portion is disconnected from the connection portion and allows the rotation of the intermediate portion, and switches to the disconnection state when the torque of at least the predetermined value acts in the connection state. Thus, at a normal time, the limiting mechanism portion in the connection state receives the reaction force of torque that the intermediate portion transmits to the output shaft so that the torque of the input shaft can be transmitted to the output shaft. When the torque of at least the predetermined value acts on the limiting mechanism portion through the intermediate portion, the limiting mechanism portion can switch to the disconnection state and can be disconnected from the connection portion. Consequently, the intermediate portion cannot transmit the torque to an output shaft side but runs idle, and hence transmission of the input torque of at least the predetermined value to the output shaft side can be prevented. The torque of the input shaft can be retransmitted to the output shaft by switching the limiting mechanism portion that has switched to the disconnection state to the former connection state. From the above, according to the present invention, the torque transmission mechanism in which resetting is possible after activation of a torque limiting function can be obtained.

In the aforementioned torque transmission mechanism according to this aspect, the limiting mechanism portion preferably includes a switching portion that is movable to a connection position where the switching portion engages with the connection portion in the connection state and a disconnection position where the switching portion disengages from the connection portion in the disconnection state, and a torque limiting portion that supports the switching portion and allows movement of the switching portion toward the disconnection position when the torque of at least the predetermined value acts on the switching portion at the connection position. According to this structure, the switching portion can be moved from the connection position to the disconnection position by the torque that acts on the switching portion from an intermediate portion side.

In this case, the limiting mechanism portion preferably further includes a recovery input portion that moves the switching portion to the connection position. According to this structure, after the switching portion is moved to the disconnection position, the switching portion can be easily returned to the connection position by the recovery input portion (can be reset to the connection state).

In the aforementioned structure in which the limiting mechanism portion includes the recovery input portion, the torque transmission mechanism preferably further includes a housing that stores the limiting mechanism portion, and the recovery input portion is preferably provided such that one end side thereof is fixed to the switching portion and the other end side thereof is exposed to the outside of the housing, and is preferably configured to move the switching portion to the connection position on the basis of operation from the outside of the housing. According to this structure, a resetting operation can be performed from the outside of the housing. Therefore, no operation for partially disassembling the housing (such as a lid portion) to expose the switching portion and moving the switching portion, for example, is required, and hence the resetting operation can be simplified.

In the aforementioned structure in which the limiting mechanism portion includes the switching portion and the torque limiting portion, the connection portion is preferably a connection gear provided in the intermediate portion, and the switching portion is preferably a sector gear, a portion of which is a gear section that meshes with the connection gear. According to this structure, a position where the gear section of the switching portion meshes with the connection gear of the intermediate portion can be set to the connection position, and a position where the gear section no longer meshes with the connection gear can be set to the disconnection position. Thus, the switching portion can be easily moved to the connection position and the disconnection position simply by its rotation. Furthermore, even when the switching portion rotates to the disconnection position, the gear section can mesh with the connection gear again simply by reversely rotating the switching portion. Therefore, when the switching portion is returned to the connection position, it is not necessary to accurately align the rotation position of the switching portion with the rotation position of the connection portion, and hence the resetting operation can be further simplified.

In the aforementioned torque transmission mechanism according to this aspect, the transmission mechanism portion is preferably a planetary gear mechanism that includes the input shaft including a sun gear, the output shaft including a planetary gear, and the intermediate portion including an internal ring gear, and the connection portion is preferably provided in the outer periphery of the intermediate portion. According to this structure, the limiting mechanism portion and the intermediate portion (connection portion) can be connected to each other with a simple structure of simply providing the connection portion in the outer periphery of the intermediate portion. Furthermore, it is only required to provide the connection portion in the outer periphery of the planetary gear mechanism (intermediate portion) regardless of the internal structure of the planetary gear mechanism that transmits torque, and hence the degree of freedom of design can be maintained even when the limiting mechanism portion is provided.

In the aforementioned structure in which the limiting mechanism portion includes the switching portion and the torque limiting portion, the torque limiting portion is preferably configured to move the switching portion to an evacuation position where the switching portion is separate from the connection portion when the switching portion reaches the disconnection position where the switching portion comes into contact with the connection portion. According to this structure, contact of the intermediate portion (connection portion) that runs idle with the switching portion can be prevented when the switching portion moves to the disconnection position so that the intermediate portion runs idle.

In this case, the torque limiting portion is preferably a ball ramp mechanism including a pair of cam portions that includes ball ramp portions, a ball arranged between the pair of cam portions, and an urging member that urges the pair of cam portions in a direction toward each other, one of the pair of cam portions is preferably connected to the switching portion, and is preferably relatively movable with respect to the other of the pair of cam portions, and the pair of cam portions preferably includes slope paths sloped such that the ball is guided from a first portion corresponding to the disconnection position of the switching portion toward a second portion corresponding to the evacuation position in a state where the urging force of the urging member acts. According to this structure, a structure of voluntarily moving the switching portion to the evacuation position when the switching portion reaches the disconnection position can be obtained with a simple structure of providing the slope paths on the cam portions of the ball ramp mechanism without providing an external power source such as an actuator. Furthermore, when the torque is limited by breakage of a shaft member as is conventional, the predetermined value (limit value) of the torque depends on the processing accuracy of the shaft member, the material hardness of the shaft member, etc. Thus, the predetermined value of the torque fluctuates with variations in the processing accuracy, the material hardness, etc. On the other hand, according to the present invention, the ball ramp mechanism can be employed as the torque limiting portion, and hence variations in the predetermined value of the torque for moving the switching portion can be suppressed. Consequently, an accurate torque limiting operation is enabled.

Effect of the Invention

As hereinabove described, according to the present invention, the torque transmission mechanism in which resetting is possible after activation of the torque limiting function can be provided.

MODES FOR CARRYING OUT THE INVENTION

An embodiment embodying the present invention is hereinafter described on the basis of the drawings.

The overall structure of a torque transmission mechanism 1 according to the embodiment of the present invention is now described with reference to FIGS. 1 to 6.

Figure 1:
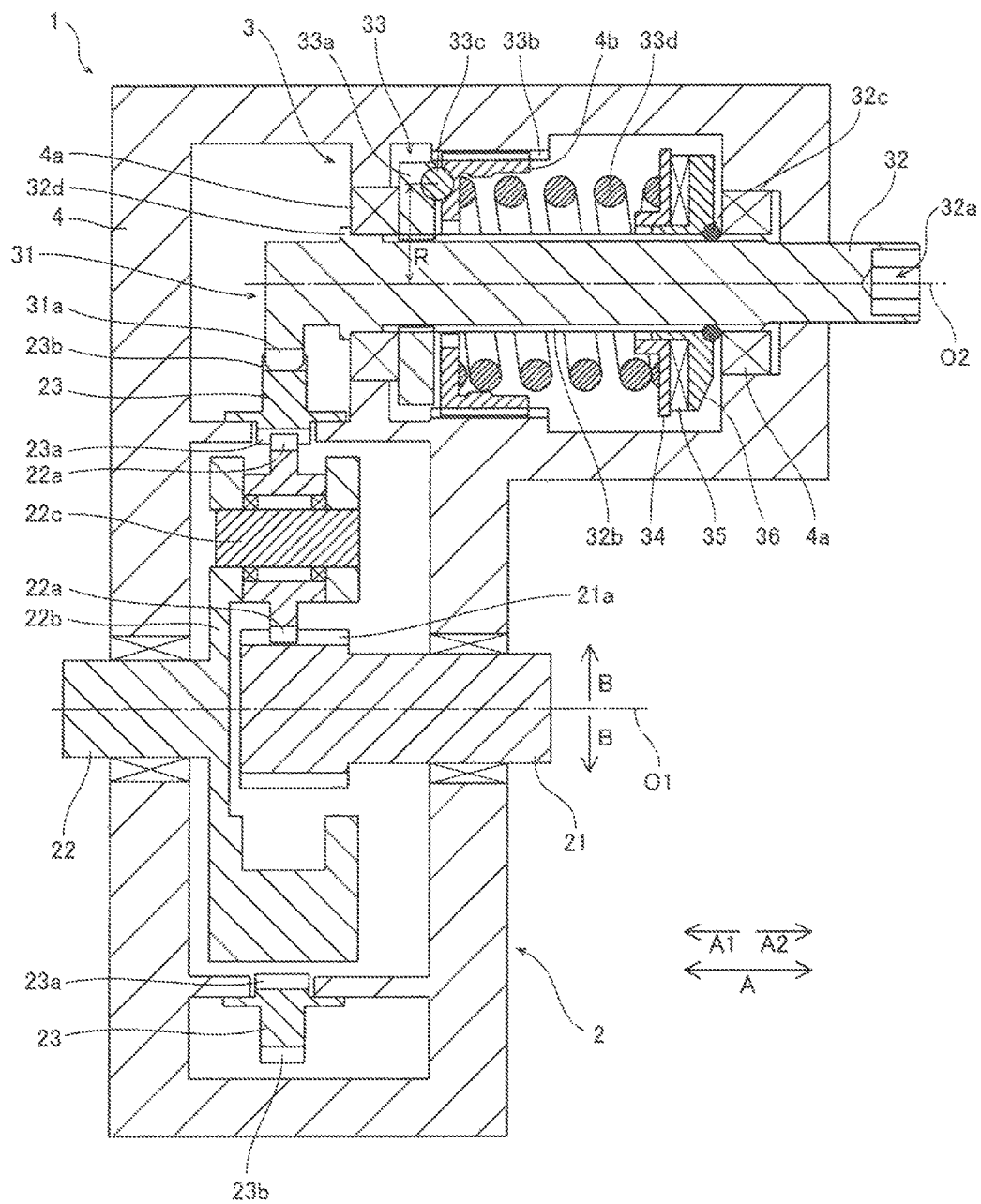
FIG. 1 A schematic longitudinal sectional view showing a torque transmission mechanism according to an embodiment of the present invention.

As shown in FIG. 1, the torque transmission mechanism 1 according to this embodiment has a torque limiting function that transmits input torque input into an input shaft 21 to an output shaft 22 but prevents transmission of input torque of at least a predetermined value to an output shaft 22 side. The torque transmission mechanism 1 includes a transmission mechanism portion 2 that transmits torque from the input shaft 21 to the output shaft 22 and a limiting mechanism portion 3 that prevents the transmission of the input torque of at least the predetermined value to the output shaft 22 side. The transmission mechanism portion 2 and the limiting mechanism portion 3 are stored in a shared (single) housing 4.

The input shaft 21 is connected to an actuator side, such as a motor that generates input torque (drive torque). The output shaft 22 is connected to a drive portion that is a transmission destination of the drive torque of an actuator. When the drive portion malfunctions for some reason, excessive input torque may be input into the input shaft 21 in order for the drive portion that malfunctions to operate. In this case, the torque transmission mechanism 1 is configured to actuate the limiting mechanism portion 3 using the input of the torque of at least the predetermined value as a trigger. Consequently, the torque transmission mechanism 1 is configured to prevent excessive torque from acting on a power transmission system from the actuator to the drive portion.

The transmission mechanism portion 2 includes the input shaft 21, the output shaft 22, and an intermediate portion 23 including a connection portion 23b. The transmission mechanism portion 2 is configured to transmit the input torque input into the input shaft 21 to the output shaft 22 through the intermediate portion 23. According to this embodiment, the transmission mechanism portion 2 is a planetary gear mechanism including a sun gear 21a, planetary gears 22a, and a ring gear (internal gear) 23a. A direction A in which the rotation central axis O1 of the input shaft 21 and the output shaft 22 extends is hereinafter referred to as an axial direction. A radial direction orthogonal to the axial direction A and about the central axis O1 is shown as a direction B.

The input shaft 21 includes the sun gear 21a on one end on the output shaft 22 side (A1 side). The input shaft 21 is supported by the housing 4 to be rotatable about the central axis O1.

The output shaft 22 is a rotary shaft (driven shaft) that rotates according to the input shaft 21. The output shaft 22 includes the planetary gears 22a and a carrier portion 22b. The planetary gears 22a are provided to mesh with the sun gear 21a of the input shaft 21 and to mesh with the ring gear 23a of the intermediate portion 23. Multiple (three, for example) planetary gears 22a are provided at equal angular intervals about the central axis O1 although not shown. The carrier portion 22b supports the multiple planetary gears 22a such that the planetary gears 22a each are rotatable about a shaft portion 22c. A shaft section of the carrier portion 22b on an A1 direction side is rotatably supported by the housing 4.

The intermediate portion 23 is an annular member arranged outward of the input shaft 21 and the output shaft 22 in the radial direction B. The intermediate portion 23 includes the ring gear (internal gears) 23a in its inner periphery. According to this embodiment, the intermediate portion 23 includes the connection portion 23b in its outer periphery. The connection portion 23b is configured to be freely connected to and disconnected from the limiting mechanism portion 3, as described later. The intermediate portion 23 is supported by the housing 4 to be rotatable about the central axis O1. Thus, rotation of the intermediate portion 23 is limited (becomes impossible) by the limiting mechanism portion 3 in a state where the intermediate portion 23 is connected to the limiting mechanism portion 3 (connection state). On the other hand, rotation of the intermediate portion 23 about the central axis O1 becomes possible in a state where the intermediate portion 23 is disconnected from the limiting mechanism portion 3 (disconnection state).

Figure 2:
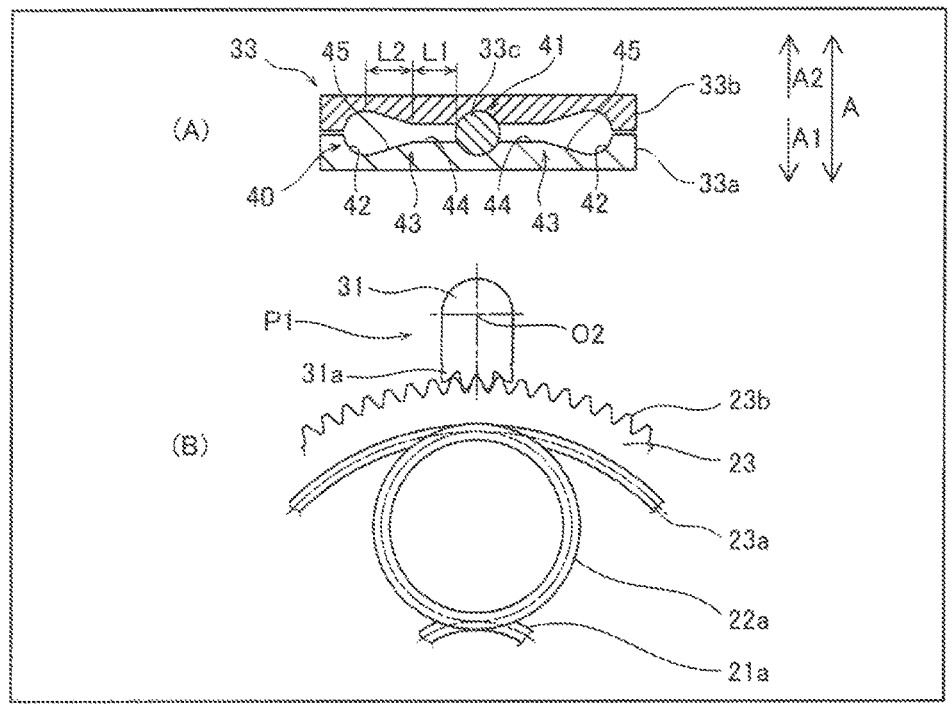
FIG. 2 View (A) is a schematic development view of a ball storage portion of a torque limiting portion at a connection position. View (B) is a schematic view of a switching portion and a connection portion at the connection position as viewed in an axial direction.

According to this embodiment, the connection portion 23b is a connection gear provided on the outer peripheral surface of the intermediate portion 23, as shown in view (B) of FIG. 2. The connection portion 23b is an external gear for connection circumferentially formed over the entire circumference of the outer peripheral surface of the intermediate portion 23. A gear section of the connection portion 23b is a spur gear. The connection portion 23b is configured to mesh with a switching portion (sector gear) 31, described later, of the limiting mechanism portion 3. Thus, the intermediate portion 23 is formed with the internal gear (ring gear 23a), which meshes with the planetary gears 22a, on its inner peripheral surface, and is formed with the outer gear (connection portion 23b), which meshes with the switching portion 31, on its outer peripheral surface. As shown in FIG. 1, the ring gear 23a and the connection portion 23b are arranged at the same position in the axial direction A.

The limiting mechanism portion 3 is arranged outside the transmission mechanism portion 2 (outward position in the radial direction B). The limiting mechanism portion 3 is configured to be capable of switching between the connection state where the limiting mechanism portion 3 is connected to the connection portion 23b and limits rotation of the intermediate portion 23 and the disconnection state where the limiting mechanism portion 3 is disconnected from the connection portion 23b and allows the rotation of the intermediate portion 23. Furthermore, the limiting mechanism portion 3 is configured to switch to the disconnection state when the torque of at least the predetermined value acts in the connection state.

Specifically, the limiting mechanism portion 3 includes the switching portion 31, a recovery input portion 32, and a torque limiting portion 33.

The switching portion 31 is provided on one end (A1-side end) of the recovery input portion 32. The switching portion 31 is configured to be movable to a connection position P1 (see view (B) of FIG. 2) where the switching portion 31 engages with the connection portion 23b in the connection state, and a disconnection position P2 (see view (B) of FIG. 3) and an evacuation position P3 (see view (B) of FIG. 4) both where the switching portion 31 disengages from the connection portion 23b in the disconnection state. The switching portion 31 is a sector gear including a gear section 31a that meshes with the connection portion (connection gear) 23b in a portion of its outer periphery. Therefore, the gear section 31a of the switching portion 31 meshes with the connection portion 23b at the connection position P1, as shown in view (B) of FIG. 2. At the connection position P1, the input torque (reaction force in torque transmission) partially acts on the switching portion 31 from an intermediate portion 23 side by gear meshing. At the connection position P1, the switching portion 31 receives the torque from a connection portion 23b side and supports the rotation of the intermediate portion 23 about the central axis O1.

Figure 3:
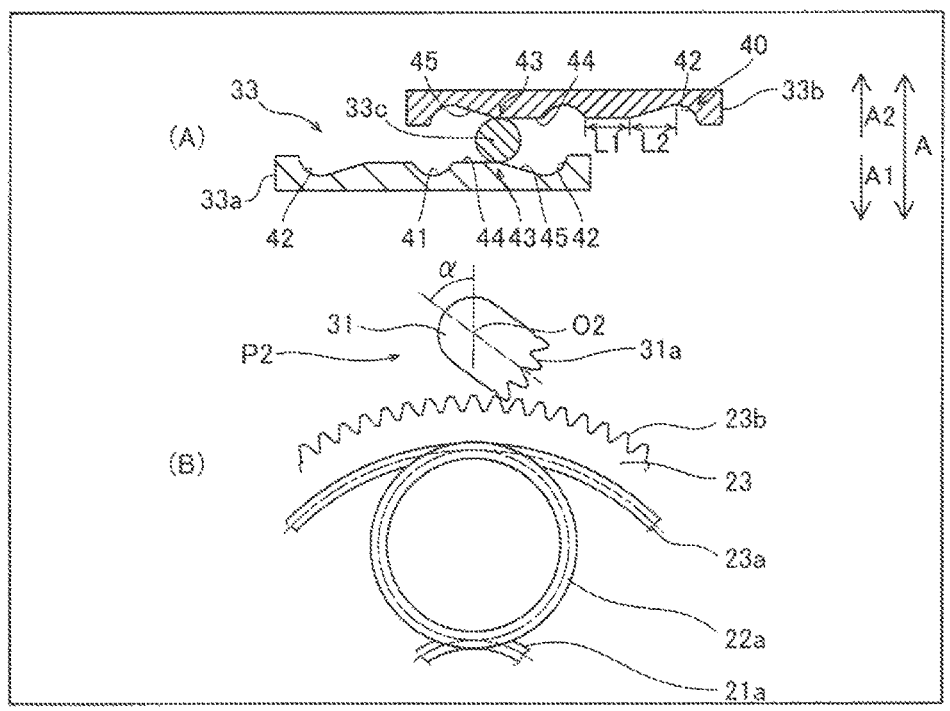
FIG. 3 View (A) is a schematic development view of the ball storage portion of the torque limiting portion at a disconnection position. View (B) is a schematic view of the switching portion and the connection portion at the disconnection position as viewed in the axial direction.

As shown in view (B) of FIG. 3, the gear section 31a no longer meshes with the connection portion 23b at the disconnection position P2 so that the switching portion 31 disengages from the connection portion 23b. Thus, the switching portion 31 no longer receives the torque from the connection portion 23b side at the disconnection position P2. The disconnection position P2 is a position where the switching portion 31 comes into contact with the connection portion 23b (position immediately after no more meshing). As shown in view (B) of FIG. 4, the evacuation position P3 is a position to which the switching portion 31 further rotates from the disconnection position P2 until the switching portion 31 is separate from the connection portion 23b. Therefore, at the evacuation position P3, contact of the switching portion 31 with the connection portion 23b is prevented.

As shown in FIG. 1, the recovery input portion 32 is a shaft member (input shaft) that extends in the direction A. One end side (A1-side end) of the recovery input portion 32 is fixed to the switching portion 31. The recovery input portion 32 is rotatably supported by the housing 4 through a radial bearing 4a. Therefore, the switching portion 31 and the recovery input portion 32 integrally rotate about a central axis O2. Although FIG. 1 illustrates that the switching portion 31 is integrally formed in the recovery input portion 32, the recovery input portion 32 and the switching portion 31 may be separate from each other.

The recovery input portion 32 is provided such that the other end side (A2-side end) is exposed to the outside of the housing 4. The recovery input portion 32 is configured to move the switching portion 31 to the connection position P1 on the basis of operation from the outside of the housing 4. Specifically, the other end (A2-side end) of the recovery input portion 32 is formed with an engagement portion 32a such as a hexagonal hole. A tool or the like engages with the engagement portion 32a and rotates the recovery input portion 32 so that the recovery input portion 32 can move (return) the switching portion 31 from the disconnection position P2 (evacuation position P3) to the connection position P1.

The torque limiting portion 33 is configured to support the switching portion 31 and to allow movement of the switching portion 31 toward the disconnection position P2 when the torque of at least the predetermined value acts on the switching portion 31 at the connection position P1. Furthermore, the torque limiting portion 33 is configured to move the switching portion 31 to the evacuation position P3 where the switching portion 31 is separate from the connection portion 23b when the switching portion 31 reaches the disconnection position P2 where the switching portion 31 comes into contact with the connection portion 23b.

Specifically, the torque limiting portion 33 is a ball ramp mechanism including a pair of cam portions 33a and 33b, balls 33c, and a coil spring 33d. The torque limiting portion 33 is annularly (cylindrically) formed, and the recovery input portion 32 is inserted thereinto. The coil spring 33d is an example of the "urging member" in the present invention.

A cam portion 33a on the A1 side of the pair of cam portions engages with a spline portion 32b of the recovery input portion 32. A cam portion 33b on an A2 side engages with a spline portion 4b of the housing 4. Thus, one cam portion 33a is connected to the switching portion 31 through the recovery input portion 32, and is configured to be relatively movable (rotatable) about the central axis O2 with respect to the other cam portion 33b. In other words, the cam portion 33a on the A1 side rotates about the central axis O2 along with the switching portion 31 and the recovery input portion 32. On the other hand, the cam portion 33b on the A2 side is fixed in a rotation direction about the central axis O2 by the housing 4. The pair of cam portions 33a and 33b is configured to be movable in the axial direction A by spline engagement.

The pair of cam portions 33a and 33b is urged in a direction toward each other by the coil spring 33d. Specifically, the coil spring 33d urges the cam portion 33b toward a cam portion 33a side (A1 side) through the balls 33c. The A2-side end of the coil spring 33d is supported by a lock member 32c fixed to the recovery input portion 32 through an annular spring seat 34, a thrust bearing 35, and a bearing pedestal 36. The A1 direction side of the coil spring 33d is supported by a flange portion 32d of the recovery input portion 32 through the cam portion 33b, the balls 33c, the cam portion 33a, and the radial bearing 4a.

Figure 5:
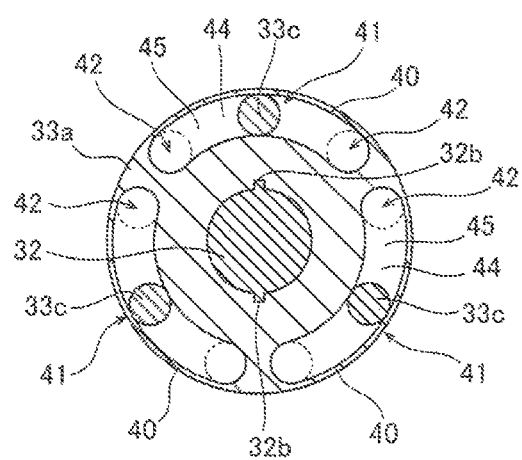
FIG. 5 A schematic view showing an axial end face of a cam portion.

The balls 33c are arranged between the pair of cam portions 33a and 33b. Specifically, ball storage portions 40 are formed on the A2-side end face of the cam portion 33a, as shown in FIG. 5. Multiple (three) ball storage portions 40 are provided at equal angular intervals in a rotation direction. Therefore, the ball storage portions 40 are recessed portions each having an arcuate shape of about one-third of the circumference. Although not shown, the A1-side end face of the cam portion 33b is also similar. In these ball storage portions 40, the balls 33c are arranged, respectively. The balls 33c move in the ball storage portions 40 along with rotation of the cam portion 33a. In FIG. 5, an end face portion of the cam portion 33a excluding the ball storage portions 40 is shown by hatching for convenience in order to distinguish from the ball storage portions 40.

Figure 4:
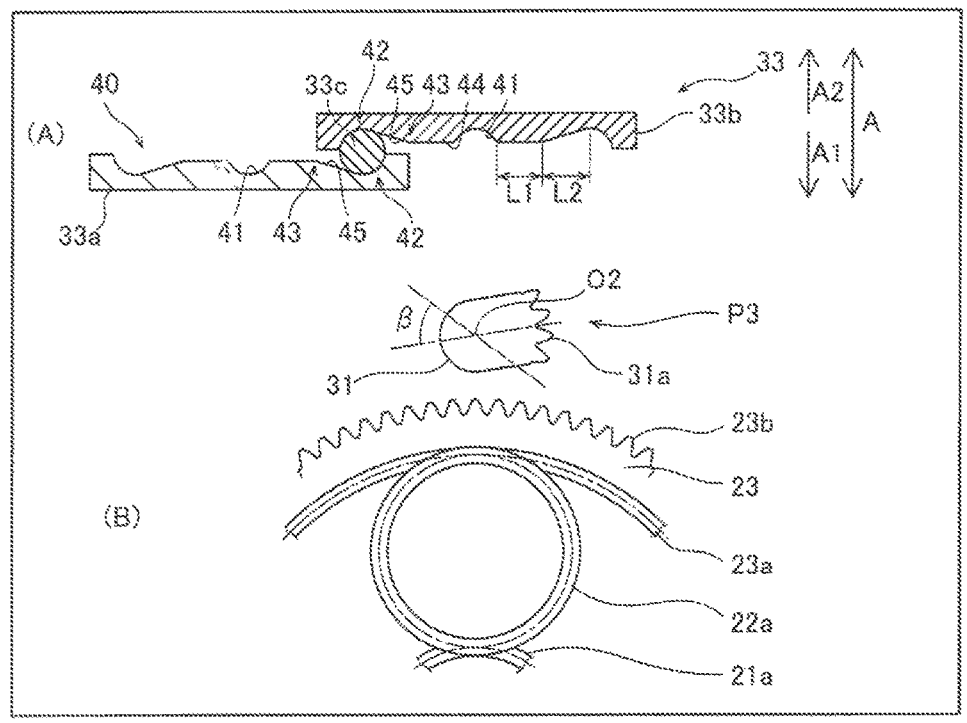
FIG. 4 View (A) is a schematic development view of the ball storage portion of the torque limiting portion at an evacuation position. View (B) is a schematic view of the switching portion and the connection portion at the evacuation position as viewed in the axial direction.

Each of view (A) of FIG. 2, view (A) of FIG. 3, and view (A) of FIG. 4 is a development view of one ball storage portion 40. According to this embodiment, the ball storage portion 40 includes a ball ramp portion 41 and a pair of ball pockets 42. In the ball storage portion 40, flat paths 44 that connect between the ball ramp portion 41 and boundary portions 43 and slope paths 45 that connect the boundary portions 43 to the ball pockets 42 are formed. The ball ramp portion 41 is a portion corresponding to the connection position P1 of the switching portion 31. The boundary portions 43 are portions corresponding to the disconnection position P2 of the switching portion 31. The ball pockets 42 are portions corresponding to the evacuation position P3 of the switching portion 31. According to the rotation direction of the cam portion 33a (i.e. the movement direction of the balls 33c), a pair of ball pockets 42, a pair of flat paths 44, and a pair of slope paths 45 are provided on opposite sides of the ball ramp portion 41, respectively. The boundary portions 43 are examples of the "first portion" in the present invention. The ball pockets 42 are examples of the "second portion" in the present invention.

The ball ramp portion 41 is a recessed inclined surface portion into which a ball 33c is fitted. A state where the ball 33c is fitted into the ball ramp portion 41 is a stable state. The rotation angular positions of the cam portions 33a and 33b are determined such that the position of this ball ramp portion 41 corresponds to the connection position P1 of the switching portion 31. Torque required for the ball 33c to climb over the ball ramp portion 41 and move in the rotation direction about the central axis O2 (i.e. torque required to rotate the cam portion 33a) corresponds to predetermined torque (torque limit value) for moving the limiting mechanism portion 3 (switching portion 31) at the connection position P1 toward the disconnection position P2.

Figure 6:
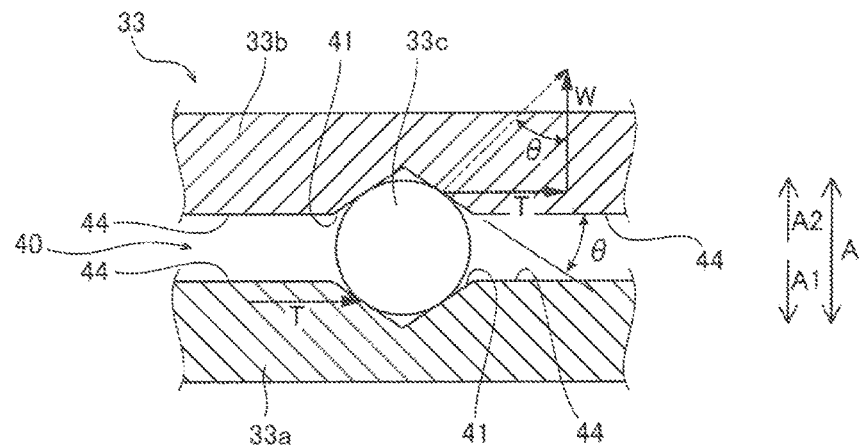
FIG. 6 A schematic view for illustrating torque and an axial force that act in ball ramp portions.

More specifically, torque T that acts on the ball 33c through the cam portion 33a and an axial force (force in the axial direction A) W generated by pressing the ball 33c against the cam portion 33b with the torque T, as shown in FIG. 6, are expressed by the following formula (1).

$$W = T/(R \times \tan \theta) \quad (1)$$

Here, R is a distance (radius) (see FIG. 1) from the central axis O2 to the center of the ball 33c. θ is the inclined angle of the ball ramp portion 41.

From the above formula (1), the magnitude of an axial force $W_{max}$ in the case where a torque upper limit $T_{max}$ at which the switching portion 31 at the connection position P1 can be supported is input can be obtained. The spring constant, dimension, etc. of the coil spring 33d are set such that an urging force equivalent to the obtained axial force $W_{max}$ is applied from the coil spring 33d. The torque $T_{max}$ is torque that acts on the switching portion 31 from the connection portion 23b of the intermediate portion 23. Thus, this torque $T_{max}$ is determined in association with a predetermined value of the input torque of the input shaft 21 (an acceptable upper limit of the torque).

When the torque T ($\geq T_{max}$) of at least the predetermined value acts on the ball 33c, the pair of cam portions 33a and 33b is separate from each other in the axial direction A against the urging force of the coil spring 33d, and the ball 33c climbs over the ball ramp portion 41 and moves in the rotation direction.

Consequently, the switching portion 31, the recovery input portion 32, and the cam portion 33a integrally rotate. Rotation of the cam portion 33b, the coil spring 33d, and the spring seat 34 is prevented by engagement between the cam portion 33b and the housing 4 (spline portion 4b).

The flat paths 44 are flat surfaces parallel to a surface (an axial end face of the cam portion) orthogonal to the central axis O2. As shown in view (A) of FIG. 2 and view (A) of FIG. 3, the length L1 of a flat path 44 corresponds to a rotation angle α (see view (B) of FIG. 3) between the connection position P1 and the disconnection position P2 of the switching portion 31. More specifically, when the ball 33c reaches a boundary portion 43, which is the end point of the flat path 44, the switching portion 31 reaches the disconnection position P2. During this flat path 44, a state where the gear section 31a of the switching portion 31 meshes with the connection portion 23b of the intermediate portion 23 is maintained, and hence the switching portion 31 and the cam portion 33a are rotated by the torque that acts on the switching portion 31 from the intermediate portion 23.

The slope paths 45 are sloped such that the ball 33c is guided from the boundary portions 43 corresponding to the disconnection position P2 of the switching portion 31 toward the ball pockets 42 corresponding to the evacuation position P3 in a state where the urging force of the coil spring 33d acts. More specifically, the slope paths 45 are sloped such that an interval between the pair of cam portions 33a and 33b is increased from the boundary portions 43 toward the ball pockets 42. As shown in view (A) of FIG. 3 and view (A) of FIG. 4, the length L2 of a slope path 45 corresponds to a rotation angle β (see view (B) of FIG. 4) between the disconnection position P2 and the evacuation position P3 of the switching portion 31. When the ball 33c reaches the slope path 45 at the boundary portion 43, the urging force (component force) of the coil spring 33d acts on the ball 33c along the slope path 45 toward a ball pocket 42. Consequently, on the slope path 45, the ball 33c is voluntarily (without torque application from the connection portion 23b to the switching portion 31) moved from the boundary portion 43 to the ball pocket 42. Therefore, the cam portion 33a rotates following movement of the ball 33c, and hence the switching portion 31 voluntarily rotates from the disconnection position P2 to the evacuation position P3.

Movements of the torque transmission mechanism 1 according to this embodiment are now described with reference to FIG. 1 and view (A) and view (B) of FIG. 2 to view (A) and view (B) of FIG. 4.

In the connection state of the limiting mechanism portion 3, the switching portion 31 meshes with and is connected to the connection portion 23b at the connection position P1, as shown in view (A) of FIG. 2 and view (B) of FIG. 2. When the input shaft 21 is rotated, as shown in FIG. 1, the sun gear 21a rotates the planetary gears 22a. The planetary gears 22a rotate while meshing with the ring gear 23a so as to rotate (revolve) about the central axis O1 along the inner peripheral surface of the intermediate portion 23. This rotation about the central axis O1 results in rotation of the carrier portion 22b, and the output shaft 22 is rotated at a predetermined speed reduction ratio. At this time, torque that acts on the intermediate portion 23 (reaction force in rotating the planetary gears 22a) is received by the torque limiting portion 33 through the switching portion 31 that meshes with the connection portion 23b.

When rotation of the output shaft 22 is impossible for some reason, for example, the torque that acts on the intermediate portion 23 is increased through the sun gear 21a, the planetary gears 22a, and the ring gear 23a. At this time, the cam portion 33a, the recovery input portion 32, and the switching portion 31 start to integrally rotate about the central axis O2 when the torque that acts on the switching portion 31 through the intermediate portion 23 reaches at least the predetermined value ($T_{max}$). In addition, the intermediate portion 23 also starts to rotate about the central axis O1.

As shown in view (A) of FIG. 3 and view (B) of FIG. 3, the limiting mechanism portion 3 enters the disconnection state where the limiting mechanism portion 3 is disconnected from the transmission mechanism portion 2 when the switching portion 31 reaches the disconnection position P2 where the gear section 31a and the connection portion 23b no longer mesh with each other. Consequently, the intermediate portion 23 runs idle about the central axis O1 by the input torque of the input shaft 21. Therefore, transmission pf the input torque to the output shaft 22 side is prevented even when rotation on the output shaft 22 side remains impossible.

At the disconnection position P2, the ball 33c reaches the boundary portion 43, and hence the ball 33c voluntarily moves to the ball pocket 42 along the slope path 45 by the urging force of the coil spring 33d. The cam portion 33a rotates following the movement of the ball 33c, and hence the switching portion 31 voluntarily rotates from the disconnection positions P2 to the evacuation position P3, as shown in view (A) of FIG. 4 and view (B) of FIG. 4. Thus, contact of the gear section 31a of the switching portion 31 having moved to the evacuation position P3 with the rotating connection portion 23b of the intermediate portion 23 is prevented.

After actuation of the limiting mechanism portion 3 (after switching to the disconnection state), an operator carries out an operation for rotating the recovery input portion 32 by engaging the tool or the like with the engagement portion 32a outside the housing 4, as shown in FIG. 1, in the case where the limiting mechanism portion 3 is recovered to its former connection state. Thus, the switching portion 31 is rotated from the evacuation position P3 to the connection position P1. In this case, the gear section 31a of the switching portion 31 meshes with any section of the circumferential connection portion 23b, and hence rotation alignment between the switching portion 31 and the intermediate portion 23 (connection portion 23b) is not necessary. When the switching portion 31 returns to the connection position P1, the ball 33c is fitted into the ball ramp portion 41, rotation of the switching portion 31 is prevented until the torque of at least the predetermined value ($T_{max}$) acts again, and the limiting mechanism portion 3 recovers to its former connection state.

Figure 7:
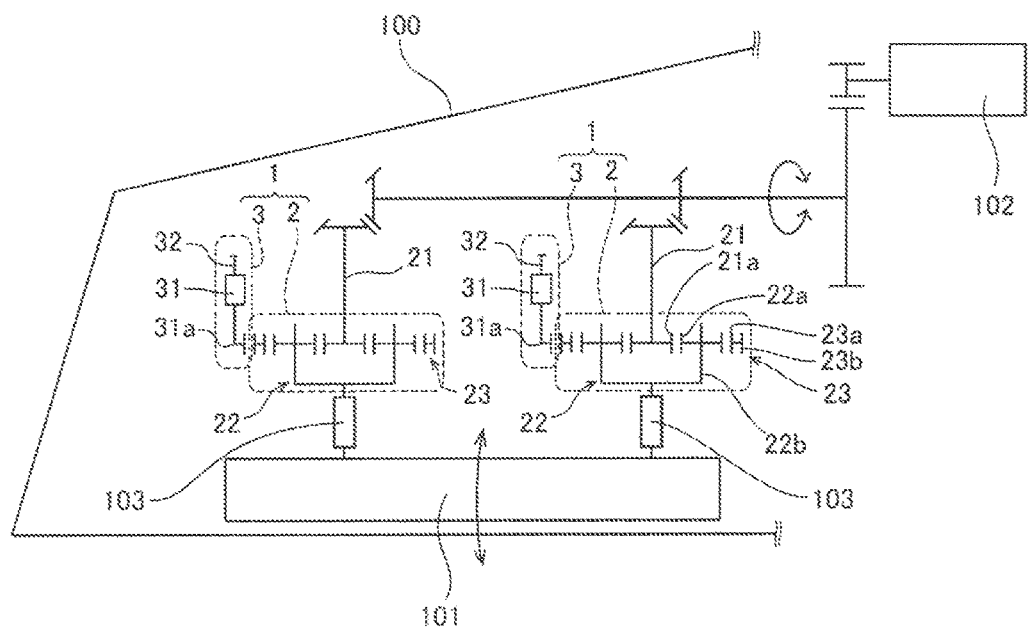
FIG. 7 A schematic view showing an example of applying the torque transmission mechanism according to the embodiment of the present invention to a rudder face driving device of an aircraft.

The torque transmission mechanism 1 configured as described above is applicable to a rudder face controller (rudder face driving device) of an aircraft 100, for example, as shown in FIG. 7. When the limiting mechanism portion 3 is in the connection state (the switching portion 31 is at the connection position P1), the input torque of a motor 102 on an input shaft 21 side is transmitted to the output shaft 22 side through the transmission mechanism portion 2. Rotation of the output shaft 22 is transformed to linear movement for rotating a rudder face (flap) 101 by a linear movement mechanism 103 such as a ball screw mechanism. Consequently, the rudder face 101 rotates by a desired angle by driving of the motor 102. When the torque of at least the predetermined value acts on the limiting mechanism portion 3 by fixation of the rudder face 101 or the like, the limiting mechanism portion 3 is switched to the disconnection state. When the limiting mechanism portion 3 is in the disconnection state, the intermediate portion 23 runs idle, and the input torque on the input shaft 21 side is no longer transmitted to the output shaft 22 side. FIG. 7 shows only the port side of the aircraft 100, but the starboard side of the aircraft 100 is also similar.

According to this embodiment, the following effects can be obtained.

According to this embodiment, as hereinabove described, the connection portion 23b is provided in the intermediate portion 23 of the transmission mechanism portion 2. Furthermore, the limiting mechanism portion 3 that is capable of switching between the connection state where the limiting mechanism portion 3 is connected to the connection portion 23b and limits the rotation of the intermediate portion 23 and the disconnection state where the limiting mechanism portion 3 is disconnected from the connection portion 23b and allows the rotation of the intermediate portion 23, and switches to the disconnection state when the torque of at least the predetermined value acts in the connection state is provided. Thus, at a normal time, the limiting mechanism portion 3 in the connection state receives the reaction force of the torque that the intermediate portion 23 transmits to the output shaft 22 so that the torque of the input shaft 21 can be transmitted to the output shaft 22. When the torque of at least the predetermined value acts on the limiting mechanism portion 3 through the intermediate portion 23, the limiting mechanism portion 3 can switch to the disconnection state and can be disconnected from the connection portion 23b. Consequently, the intermediate portion 23 cannot transmit the torque to the output shaft 22 side but runs idle, and hence transmission of the input torque of at least the predetermined value to the output shaft 22 side can be prevented. The torque of the input shaft 21 can be retransmitted to the output shaft 22 by switching the limiting mechanism portion 3 that has switched to the disconnection state to the former connection state. From the above, according to this embodiment, the torque transmission mechanism 1 in which resetting is possible after activation of a torque limiting function can be obtained. Consequently, in the torque transmission mechanism 1 according to this embodiment, no component replacement operation is required to reset the torque limiting function, and the torque limiting function can be recovered promptly. Thus, when the torque transmission mechanism 1 is used in the rudder face controller of the aircraft 100, for example, as shown in FIG. 7, the torque limiting function can be recovered promptly within a limited amount of time, which is maintenance time for the aircraft 100.

According to this embodiment, as hereinabove described, the switching portion 31 that is movable to the connection position P1 where the switching portion 31 engages with the connection portion 23b in the connection state and the disconnection position P2 where the switching portion 31 disengages from the connection portion 23b in the disconnection state is provided in the limiting mechanism portion 3. Furthermore, the torque limiting portion 33 that supports the switching portion 31 and allows movement of the switching portion 31 toward the disconnection position P2 when the torque of at least the predetermined value acts on the switching portion 31 at the connection position P1 is provided in the limiting mechanism portion 3. Thus, the switching portion 31 can be moved from the connection position P1 to the disconnection position P2 by the torque that acts on the switching portion 31 from the intermediate portion 23 side.

According to this embodiment, as hereinabove described, the recovery input portion 32 that moves the switching portion 31 to the connection position P1 is provided in the limiting mechanism portion 3. Thus, after the switching portion 31 is moved to the disconnection position P2, the switching portion 31 can be easily returned to the connection position P1 by the recovery input portion 32 (can be reset to the connection state).

According to this embodiment, as hereinabove described, the recovery input portion 32 is provided such that one end side thereof is fixed to the switching portion 31 and the other end side thereof is exposed to the outside of the housing 4. Furthermore, the recovery input portion 32 is configured to move the switching portion 31 to the connection position P1 on the basis of operation from the outside of the housing 4. Thus, a resetting operation can be performed from the outside of the housing 4. Therefore, no operation for partially disassembling the housing 4 to expose the switching portion 31 and moving the switching portion 31, for example, is required, and hence the resetting operation can be simplified.

According to this embodiment, as hereinabove described, the connection portion 23b includes the connection gear provided in the intermediate portion 23. Furthermore, the switching portion 31 includes the sector gear, a portion of which is the gear section 31a that meshes with the connection gear. Thus, a position where the gear section 31a of the switching portion 31 meshes with the connection gear of the intermediate portion 23 can be set to the connection position P1, and a position where the gear section 31a no longer meshes with the connection gear can be set to the disconnection position P2. Thus, the switching portion 31 can be easily moved to the connection position P1 and the disconnection position P2 simply by its rotation. Furthermore, even when the switching portion 31 rotates to the disconnection position P2, the gear section 31a and the connection gear (switching portion 31) can mesh with each other again simply by reversely rotating the switching portion 31. Therefore, when the switching portion 31 is returned to the connection position P1, it is not necessary to accurately align the rotation position of the switching portion 31 with the rotation position of the connection portion 23b, and hence the resetting operation can be further simplified.

According to this embodiment, as hereinabove described, the transmission mechanism portion 2 includes the planetary gear mechanism that includes the input shaft 21 including the sun gear 21a, the output shaft 22 including the planetary gears 22a, and the intermediate portion 23 including the internal ring gear 23a. Furthermore, the connection portion 23b is provided in the outer periphery of the intermediate portion 23. Thus, the limiting mechanism portion 3 and the intermediate portion 23 (connection portion 23b) can be connected to each other with a simple structure of simply providing the connection portion 23b in the outer periphery of the intermediate portion 23. Furthermore, it is only required to provide the connection portion 23b in the outer periphery of the planetary gear mechanism (intermediate portion 23) regardless of the internal structure of the planetary gear mechanism (transmission mechanism portion 2) that transmits torque, and hence the degree of freedom of design can be maintained even when the limiting mechanism portion 3 is provided.

According to this embodiment, as hereinabove described, the torque limiting portion 33 is configured to move the switching portion 31 to the evacuation position P3 where the switching portion 31 is separate from the connection portion 23b when the switching portion 31 reaches the disconnection position P2 where the switching portion 31 comes into contact with the connection portion 23b. Thus, contact of the intermediate portion 23 (connection portion 23b) that runs idle with the switching portion 31 can be prevented when the switching portion 31 moves to the disconnection position P2 so that the intermediate portion 23 runs idle.

According to this embodiment, as hereinabove described, the torque limiting portion 33 includes the ball ramp mechanism including the pair of cam portions 33a and 33b, the balls 33c, and the coil spring 33d. Furthermore, one cam portion 33a is connected to the switching portion 31, and is relatively movable with respect to the other cam portion 33b. In addition, the slope paths 45 sloped such that the ball 33c is guided from the boundary portions 43 corresponding to the disconnection position P2 of the switching portion 31 toward the ball pockets 42 corresponding to the evacuation position P3 in the state where the urging force of the coil spring 33d acts are provided on the pair of cam portions 33a and 33b. Thus, a structure of voluntarily moving the switching portion 31 to the evacuation position P3 when the switching portion 31 reaches the disconnection position P2 can be obtained with a simple structure of providing the slope paths 45 on the cam portions 33a and 33b of the ball ramp mechanism without providing an external power source such as an actuator. Furthermore, the torque limiting portion 33 including the ball ramp mechanism is provided so that variations in the predetermined value ($T_{max}$) of the torque for moving the switching portion 31 can be suppressed, unlike the case where the torque is limited by breakage of a shaft member as is conventional. Consequently, an accurate torque limiting operation is enabled.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the example of applying the torque transmission mechanism to the rudder face driving device of the aircraft has been shown in the aforementioned embodiment, the present invention is not restricted to this. The torque transmission mechanism according to the present invention may be applied to another drive portion of the aircraft, for example. Alternatively, the torque transmission mechanism according to the present invention may be applied to a power transmission system of a general industrial machine or the like other than the aircraft.

While the example of rotating the switching portion 31 of the limiting mechanism portion 3 about the central axis O2 has been shown in the aforementioned embodiment, the present invention is not restricted to this. The switching portion may be linearly moved to the connection position and the disconnection position (evacuation position), for example. In this case, the switching portion may include a rack gear not the sector gear, for example.

While the example in which the torque limiting portion 33 of the limiting mechanism portion 3 includes the ball ramp mechanism has been shown in the aforementioned embodiment, the present invention is not restricted to this. According to the present invention, the torque limiting portion may include a multi-plate brake mechanism in which multiple friction plates are aligned along the axial direction A.

While the example in which the transmission mechanism portion 2 includes the planetary gear mechanism has been shown in the aforementioned embodiment, the present invention is not restricted to this. According to the present invention, the transmission mechanism portion may include a differential gear mechanism other than the planetary gear mechanism shown in the aforementioned embodiment.

Figure 8:
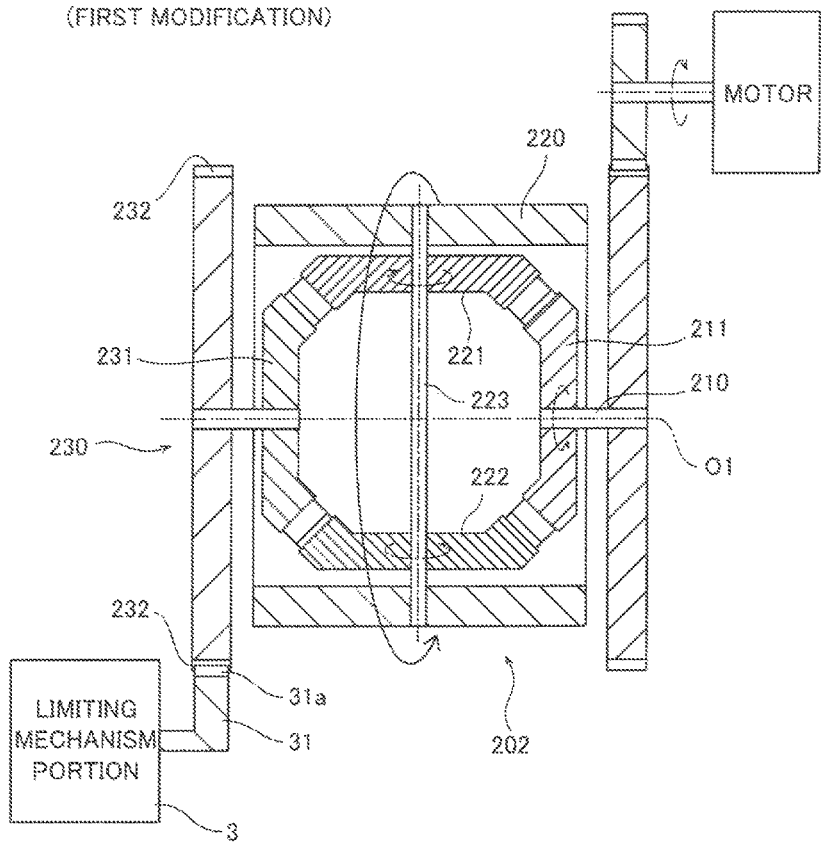
FIG. 8 A schematic view showing a transmission mechanism portion according to a first modification of the torque transmission mechanism according to the embodiment of the present invention.
Figure 8:
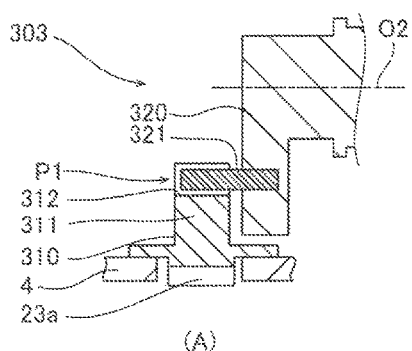

For example, as shown in a first modification of FIG. 8, a transmission mechanism portion 202 may include a differential gear mechanism including multiple bevel gears. According to the first modification, when an input shaft 210 is rotated by a motor, a first bevel gear 211 rotates a second bevel gear 221 and a third bevel gear 222. On the other hand, a fourth bevel gear 231 provided in an intermediate portion 230 is fixed by a limiting mechanism portion 3 in a connection state where the limiting mechanism portion 3 is connected to a connection portion 232 including an external gear. Thus, the second bevel gear 221 and the third bevel gear 222 that rotate about a shaft member 223 rotate (revolve) about a central axis O1 by meshing with the fourth bevel gear 231. This revolution of the second bevel gear 221 and the third bevel gear 222 results in rotation of a cylindrical output shaft 220 that supports the shaft member 223 about the central axis O1. The structure of the limiting mechanism portion 3 is similar to that according to the aforementioned embodiment. When torque of at least a predetermined value acts on the limiting mechanism portion 3 through the fourth bevel gear 231 and the connection portion 232, the limiting mechanism portion 3 enters a disconnection state, and the intermediate portion 230 (fourth bevel gear 231) runs idle. Consequently, transmission of the torque to the output shaft 220 is prevented.

Figure 9:
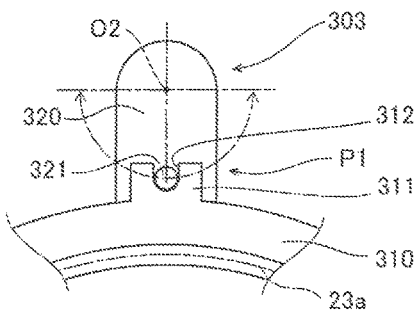
FIG. 9 View (A) is a schematic view for illustrating a switching portion and a connection portion according to a second modification of the torque transmission mechanism according to the embodiment of the present invention. View (B) is a schematic view of View (A) as viewed in an axial direction.

While the example in which the connection portion 23b of the intermediate portion 23 includes the connection gear (external gear) and the switching portion 31 of the limiting mechanism portion 3 includes the sector gear has been shown in the aforementioned embodiment, the present invention is not restricted to this. For example, as shown in a second modification of view (A) of FIG. 9 and view (B) of FIG. 9, a connection portion and a switching portion may include a combination of an engagement concave portion (notch) and an engagement convex portion (pin). According to the second modification, a connection portion 311 is provided in the outer periphery of an intermediate portion 310 to protrude radially outward, and an engagement concave portion 312 including a notch is provided in the connection portion 311. An engagement convex portion 321 including an engagement pin is provided in a switching portion 320 to extend in an axial direction A. When torque of at least a predetermined value acts on the switching portion 320 in the connection state of a limiting mechanism portion 303, the switching portion 320 rotates, and a disconnection state where an engagement convex portion 321 disengages with an engagement concave portion 312 is entered.

While the example of providing the recovery input portion 32 that moves the switching portion 31, which has moved to the evacuation position P3, to the connection position P1, has been shown in the aforementioned embodiment, the present invention is not restricted to this. According to the present invention, no recovery input portion may be provided. More specifically, the switching portion may be directly moved and be returned to its former connection position when the switching portion is moved to the disconnection position or the evacuation position. Furthermore, in the case where the recovery input portion is provided, the recovery input portion may not be exposed to the outside of the housing. The housing may be partially disassembled by detaching a lid portion, for example, and the recovery input portion in the housing may be operated.

While the example of configuring the torque limiting portion 33 to move the switching portion 31 to the evacuation position P3 when the switching portion 31 reaches the disconnection position P2 has been shown in the aforementioned embodiment, the present invention is not restricted to this. According to the present invention, the switching portion may not be moved from the disconnection position to the evacuation position. In this case, the switching portion at the disconnection position may come into contact with the connection portion of the intermediate portion that runs idle, but the switching portion may be configured to move from the disconnection position toward the evacuation position by that contact.

DESCRIPTION OF REFERENCE SIGNS

1 Torque transmission mechanism
2, 202 Transmission mechanism portion
3, 303 Limiting mechanism portion
4 Housing
21, 210 Input shaft
21a Sun gear
22, 220 Output shaft
22a Planetary gear
23, 230, 310 Intermediate portion
23a Ring gear
23b, 232, 311 Connection portion
31, 320 Switching portion
31a Gear section
32 Recovery input portion
33 Torque limiting portion
33a, 33b Cam portion
33c Ball
33d Coil spring (urging member)
41 Ball ramp portion
42 Ball pocket (second portion)
43 Boundary portion (first portion)
45 Slope path
P1 Connection position
P2 Disconnection position
P3 Evacuation position

What is claimed is:

1. A torque transmission mechanism comprising:
a transmission mechanism portion that includes an input shaft, an output shaft, and an intermediate portion including a connection portion and transmits input torque input into the input shaft to the output shaft through the intermediate portion;
a limiting mechanism portion that is capable of switching between a connection state where the limiting mechanism portion is connected to the connection portion and limits rotation of the intermediate portion and a disconnection state where the limiting mechanism portion is disconnected from the connection portion and allows the rotation of the intermediate portion, and switches to the disconnection state when torque of at least a predetermined value acts in the connection state; and
a housing that stores the limiting mechanism portion,
wherein the limiting mechanism portion includes:
a switching portion that is movable to a connection position where the switching portion engages with the connection portion in the connection state and a disconnection position where the switching portion disengages from the connection portion in the disconnection state, and
a torque limiting portion that supports the switching portion and allows movement of the switching portion toward the disconnection position when the torque of at least the predetermined value acts on the switching portion at the connection position, wherein the torque limiting portion includes an urging member disposed within the housing, and
wherein the connection portion is provided on an outer periphery of the intermediate portion.

2. The torque transmission mechanism according to claim 1, wherein the urging member urges the
switching portion toward the disconnection position when the torque of at least the predetermined value acts on the switching portion at the connection position.

3. The torque transmission mechanism according to claim 1, wherein
the limiting mechanism portion further includes a recovery input portion that moves the switching portion to the connection position.

4. The torque transmission mechanism according to claim 3, wherein
the recovery input portion is provided such that one end side thereof is fixed to the switching portion and the other end side thereof is exposed to an outside of the housing, and is configured to move the switching portion to the connection position on the basis of operation from the outside of the housing.

5. The torque transmission mechanism according to claim 1, wherein
the connection portion is a connection gear provided in the intermediate portion, and the switching portion is a sector gear, a portion of which is a gear section that meshes with the connection gear.

6. The torque transmission mechanism according to claim 1, wherein
the transmission mechanism portion is a planetary gear mechanism that includes the input shaft including a sun gear, the output shaft including a planetary gear, and the intermediate portion including an internal ring gear.

7. The torque transmission mechanism according to claim 1, wherein
the torque limiting portion is configured to move the switching portion to an evacuation position where the switching portion is separate from the connection portion when the switching portion reaches the disconnection position where the switching portion comes into contact with the connection portion.

8. The torque transmission mechanism according to claim 7, wherein
the torque limiting portion is a ball ramp mechanism including a pair of cam portions that includes ball ramp portions, a ball arranged between the pair of cam portions, and the urging member, which urges the pair of cam portions in a direction toward each other,
one of the pair of cam portions is connected to the switching portion, and is relatively movable with respect to the other of the pair of cam portions, and
the pair of cam portions includes slope paths sloped such that the ball is guided from a first portion corresponding to the disconnection position of the switching portion toward a second portion corresponding to the evacuation position in a state where an urging force of the urging member acts.

9. A torque transmission mechanism comprising:
a transmission mechanism portion that includes an input shaft, an output shaft, and an intermediate portion including a connection portion and transmits input torque input into the input shaft to the output shaft through the intermediate portion;
a limiting mechanism portion that is capable of switching between a connection state where the limiting mechanism portion is connected to the connection portion and limits rotation of the intermediate portion and a disconnection state where the limiting mechanism portion is disconnected from the connection portion and allows the rotation of the intermediate portion, and switches to the disconnection state when torque of at least a predetermined value acts in the connection state; and
a housing that stores the limiting mechanism portion, wherein the limiting mechanism portion includes:
a switching portion that is movable to a connection position where the switching portion engages with the connection portion in the connection state and a disconnection position where the switching portion disengages from the connection portion in the disconnection state, and
a torque limiting portion that supports the switching portion and allows movement of the switching portion toward the disconnection position when the torque of at least the predetermined value acts on the switching portion at the connection position, wherein the limiting mechanism portion further includes a recovery input portion that moves the switching portion to the connection position, and
the recovery input portion is provided such that one end side thereof is fixed to the switching portion and the other end side thereof is exposed to an outside of the housing, and is configured to move the switching portion to the connection position on the basis of operation from the outside of the housing.

10. The torque transmission mechanism according to claim 9, wherein
the connection portion is a connection gear provided in the intermediate portion, and
the switching portion is a sector gear, a portion of which is a gear section that meshes with the connection gear.

11. The torque transmission mechanism according to claim 9, wherein
the transmission mechanism portion is a planetary gear mechanism that includes the input shaft including a sun gear, the output shaft including a planetary gear, and the intermediate portion including an internal ring gear, and
the connection portion is provided in an outer periphery of the intermediate portion.

12. The torque transmission mechanism according to claim 9, wherein
the torque limiting portion is configured to move the switching portion to an evacuation position where the switching portion is separate from the connection portion when the switching portion reaches the disconnection position where the switching portion comes into contact with the connection portion.

13. The torque transmission mechanism according to claim 12, wherein
the torque limiting portion is a ball lamp mechanism including a pair of cam portions that includes ball lamp portions, a ball arranged between the pair of cam portions, and an urging member that urges the pair of cam portions in a direction toward each other,
one of the pair of cam portions is connected to the switching portion, and is relatively movable with respect to the other of the pair of cam portions, and
the pair of cam portions includes slope paths sloped such that the ball is guided from a first portion corresponding to the disconnection position of the switching portion toward a second portion corresponding to the evacuation position in a state where an urging force of the urging member acts.

14. A torque transmission mechanism comprising:
a transmission mechanism portion that includes an input shaft, an output shaft, and an intermediate portion including a connection portion and transmits input torque input into the input shaft to the output shaft through the intermediate portion; and
a limiting mechanism portion that is capable of switching between a connection state where the limiting mechanism portion is connected to the connection portion and limits rotation of the intermediate portion, and a disconnection state where the limiting mechanism portion is disconnected from the connection portion and allows the rotation of the intermediate portion, and that switches to the disconnection state when torque of at least a predetermined value acts in the connection state, wherein the connection portion is provided on an outer periphery of the intermediate portion, wherein the limiting mechanism portion includes:
a switching portion that is movable to a connection position where the switching portion engages with the connection portion in the connection state and a disconnection position where the switching portion disengages from the connection portion in the disconnection state, and
a torque limiting portion that supports the switching portion and allows movement of the switching portion toward the disconnection position when the torque of at least the predetermined value acts on the switching portion at the connection position,
wherein the torque limiting portion includes a cam mechanism portion connected to the switching portion and an urging member urging the switching portion via the cam mechanism portion between a first position and a second position, the first position corresponding to the connection state, and the second position corresponding to the disconnection state, and
wherein the urging member is configured to urge the switching portion to limit movement of the switching portion in the connection state and to urge the switching portion toward a direction away from the connection position in the disconnection state.

15. The torque transmission mechanism according to claim 1, wherein the housing is a first portion of a shared single housing that houses the transmission mechanism portion.

\* \* \* \* \*